US008991780B2

(12) United States Patent
Pedersen et al.

(10) Patent No.: US 8,991,780 B2

(45) Date of Patent: Mar. 31, 2015

(54) SHOCK ABSORBING SYSTEM FOR LOAD CARRIER

(75) Inventors: Tarald Tveit Pedersen, Hundvag (NO); Kjell Morten Kaldestad, Stavanger (NO)

(73) Assignee: Offshore Technology Partner AS, Stavanger (NO)

( * ) Notice: Subject to any disclaimer, the term of this patent is extended or adjusted under 35 U.S.C. 154(b) by 0 days.

(21) Appl. No.: 13/522,935

(22) PCT Filed: Feb. 8, 2011

(86) PCT No.: PCT/NO2011/000049

§ 371 (c)(1), (2), (4) Date: Sep. 24, 2012

(87) PCT Pub. No.: WO2011/099867

PCT Pub. Date: Aug. 18, 2011

(65) Prior Publication Data

US 2013/0009033 A1 Jan. 10, 2013

(30) Foreign Application Priority Data

Feb. 9, 2010 (NO) .................................... 20100201

(51) Int. Cl.

*F16M 13/00* (2006.01)

*B66C 1/10* (2006.01)

(Continued)

(52) U.S. Cl.

CPC .............. *B66C 1/10* (2013.01); *B65D 90/0033* (2013.01); *B65D 90/12* (2013.01)

USPC ..... 248/562; 248/188; 248/188.1; 248/188.2; 248/188.3; 248/638; 248/618; 248/619; 248/620; 248/621; 248/631; 108/57.12; 220/1.5; 206/521

(58) Field of Classification Search

CPC ......... F16F 15/00; F16F 15/02; F16F 15/023; F16F 15/0232; F16F 13/00; F16F 13/002; B65D 19/40

USPC ........... 248/562, 188, 119, 188.2–188.3, 638, 248/188.1, 618–621, 631, 636; 108/51–52, 108/57.12; 220/1.5; 206/521

See application file for complete search history.

(56) References Cited

U.S. PATENT DOCUMENTS 2,148,937 A * 2/1939 Gerb ............................. 188/316
2,635,838 A * 4/1953 Branson ......................... 248/562

(Continued)

FOREIGN PATENT DOCUMENTS

CN 101357707 A 2/2009
CN 201232004 Y 5/2009

(Continued)

OTHER PUBLICATIONS

International Search Report for parent application PCT/NO2011/000049, having a mailing date of May 25, 2011.

(Continued)

*Primary Examiner* — Christopher Garft

(74) *Attorney, Agent, or Firm* — Andrus Intellectual Property Law, LLP

(57) ABSTRACT

A load carrier device is provided with a support structure and means arranged for connection to a lifting means. The support structure comprises one or more shock absorbers provided with a telescoping element which in an initial position projects downwards from an underside of the support structure and is arranged for damped compressive telescoping at the contact of the load carrier with a base.

10 Claims, 3 Drawing Sheets

(51) Int. Cl.

*B65D 90/00* (2006.01)

*B65D 90/12* (2006.01)

(56) References Cited

U.S. PATENT DOCUMENTS

| | | | | | |
|---|---|---|---|---|---|
| 3,523,507 | A * | 8/1970 | Sol | 108/57.12 |
| 4,015,835 | A * | 4/1977 | Schumacher et al. | 267/124 |
| 4,431,474 | A * | 2/1984 | Gronek et al. | 156/583.1 |
| 4,709,908 | A * | 12/1987 | Joseph et al. | 267/140.4 |
| 4,877,136 | A * | 10/1989 | Mizuno et al. | 206/521 |
| 4,941,640 | A * | 7/1990 | Nakamura et al. | 248/562 |
| 5,100,096 | A * | 3/1992 | Mizuno et al. | 248/638 |
| 5,127,573 | A * | 7/1992 | Chang et al. | 228/180.22 |
| 5,217,212 | A * | 6/1993 | Chorkey et al. | 267/226 |
| 5,553,911 | A * | 9/1996 | Bodin et al. | 296/190.07 |
| 5,653,070 | A * | 8/1997 | Seguin | 52/167.1 |
| 6,637,351 | B1 * | 10/2003 | Brennan et al. | 108/54.1 |
| 6,648,295 | B2 * | 11/2003 | Herren et al. | 248/636 |
| 8,186,658 | B2 * | 5/2012 | Lewis, II | 267/131 |
| 2003/0193000 | A1 * | 10/2003 | Leveridge | 248/188.2 |
| 2007/0034768 | A1 * | 2/2007 | Stenard | 248/562 |
| 2008/0190696 | A1 * | 8/2008 | Pike et al. | 182/202 |
| 2009/0000526 | A1 * | 1/2009 | Looker | 108/57.12 |
| 2009/0078847 | A1 * | 3/2009 | McMickell et al. | 248/550 |
| 2009/0321607 | A1 * | 12/2009 | Baron et al. | 248/562 |

FOREIGN PATENT DOCUMENTS

| | | | |
|---|---|---|---|
| DE | 8705722 | U1 | 7/1987 |
| DE | 42 25 767 | A1 | 3/1994 |
| JP | 1254592 | A | 10/1989 |
| JP | 2001163543 | A | 6/2001 |
| JP | 2005132328 | A | 5/2005 |

OTHER PUBLICATIONS

Written Opinion for parent application PCT/NO2011/000049, having a mailing date of May 25, 2011.

Applicant's response dated Nov. 10, 2011 to Written Opinion of May 25, 2011 in parent application PCT/NO2011/000049.

Written Opinion for parent application PCT/NO2011/000049, having a mailing date of Jan. 25, 2012.

Applicant's response dated Feb. 21, 2012 to Written Opinion of Jan. 25, 2012 in parent application PCT/NO2011/000049.

Preliminary Report for parent application PCT/NO2011/000049, having a completion date of Sep. 30, 2012.

* cited by examiner

SHOCK ABSORBING SYSTEM FOR LOAD CARRIER

CROSS-REFERENCE TO RELATED APPLICATIONS

This application is the U.S. national stage application of International Application No. PCT/NO2011/000049, filed Feb. 8, 2011, which International application was published on Aug. 18, 2011 as International Publication No. WO 2011/099867 A1 in the English language and which application is incorporated herein by reference. The International application claims priority of Norwegian Patent Application No. 20100201, filed Feb. 9, 2010, which application is incorporated herein by reference.

BACKGROUND

The invention relates to a device for a load carrier provided with a support structure and means arranged for connection to a lifting medium, and more particularly in that the support structure comprises one or more shock absorbers provided with a telescoping element, which in an initial position projects downward from an underside of the support structure and is arranged for damped compressive telescoping at the contact of the load carrier with a base.

Load carriers, such as cargo containers, being used for transport of goods between shore and installations offshore, for example exploration or production platforms in a hydrocarbon field offshore, are often exposed to very large strains when they are moved by means of lifting cranes between a transport vessel and the installation while the ship and possibly also the installation are subjected to wave induced motions. Even if the lifting equipment is provided with heave compensators, the load carrier will often be exposed to heavy impacts when hitting the deck surface of the vessel, and such impacts often inflict extensive damage to cargo and interiors. Special containers such as containers fitted out as store rooms having shelving and other rigidly mounted equipment have an average useful life, at the worst of down to two transport rounds, i.e. two return trips to/from a shore base/installation.

Correspondingly other transfer situations may provide the same problem. The problems are thus not only tied to transfer of load carriers between ships and installations in an oil-field offshore.

The problem is in prior art sought solved by the equipment to be protected being provided with shock absorbing means, for example elastic suspension for attachment to the load carrier. This is costly and often renders limitations in the functionality of the equipment.

SUMMARY

The object of the invention is to remedy or reduce at least one of the disadvantages of the prior art, or at least to provide a useful alternative to the prior art.

The object is achieved by the features disclosed in the below description and in the subsequent claims.

In the further description the term “load carrier” is used for closable containers (containers having closed sides and top and having one or more side gates), open container (open top or one or more open sides), cargo pallets and cargo frames with or without beams defining the cargo volume. Common for all types of “load carrier” is that they are provided with a support structure that the cargo is resting on, and that the support structure is provided with hoisting attachments for releasable connection to a cargo crane. The “load carrier” may be provided with support surfaces for bearing against a lifting fork, often arranged as so-called fork pockets provided as horizontal passages in the support structure.

The invention provides in its simplest form a load carrier provided with several telescoping shock absorbers, which in their extended positions project downward from the support structure underside and are arranged to be able to abut supportingly a supporting base, such as a deck. The telescoping element of the shock absorber is, when the load carrier is not in contact with the base, arranged to be displaced to its maximum extended position, preferably by the weight of own or connected elements, alternatively assisted by one or more actuators.

The telescoping element of the shock absorber is alternatively connected to a sub-frame arranged under the support structure and arranged to be able to abut the supporting basis supportingly. The shock absorbers render a vertical displacement of the sub-frame relative to the support structure possible.

The telescoping element of the shock absorber exhibits a large degree of stability against sideways displacement as side guides are incorporated in the shock absorbers. Alternatively side guides, preventing a horizontal displacement of the sub-frame relative to the support structure when side loading is applied to the load carrier, are arranged between the sub-frame and the support structure.

The damping function of the shock absorbers is preferably active when the telescoping element in the shock absorber is displaced in a direction toward the main frame.

The shock absorbers may be incorporated in a vertical framework bounding the load carrier and possibly forming a connection between the support structure and hoisting attachments arranged in an upper portion of the load carrier.

Between the main frame and the sub-frame there may be arranged one or more actuators arranged to apply a pushing force on the sub-frame directed away from the support structure. The actuator may expediently be incorporated in one or more of the shock absorbers.

The invention relates more specifically to a shock absorbing device for a load carrier provided with a support structure and means arranged for connection to a lifting means, characterized in that the support structure comprises one or more shock absorbers provided with a telescoping element, which in an initial position projects downward from an underside of the support structure and is arranged for damped compressive telescoping at the load carrier contacting a basis.

A sub-frame arranged to abut the base supportingly, may be arranged vertically displaceable under the support frame and be connected to the telescoping element of the shock absorbers. This renders a shock absorbing action at blows against any portion of the load carrier’s lower portion.

The shock absorbers may be single acting. The shock absorbing function will thereby to a small degree affect the displacement of the shock absorbers back to an initial position.

The telescoping element of the shock absorber may be arranged to be able to be displaced to an outward projecting initial position by means of its own weight or that of connected elements, an actuator or a combination of these. There is thereby provided a series of means securing that the shock absorbers take up a correct initial position as soon as the load carrier is lifted clear of the basis.

The shock absorbers may be provided with or be connected to side stabilizing means. The shock absorbers may thereby on their own resist side loading at the load carrier hitting the basis. There may, connected to the sub-frame and the support structure, be arranged side guides preventing a horizontal displacement of the sub-frame relative to the support structure when a side load is applied to the load carrier. This renders the use of a wider spectrum of shock absorbers possible, and the sideways stability is easier to adapt to the needs.

The sub-frame may be provided with one or more side guiding elements in sliding contact with corresponding side guides in the support structure. The sideways stability is thereby upheld with simple means.

The shock absorbers may be incorporated in a vertical framework bounding the load carrier and forming a connection between the support structure and hoisting attachments arranged in an upper portion of the load carrier. The shock absorbers thereby do not take up much floor space on the load carrier.

The sub-frame may be provided with means arranged to cover the openings between the sub-frame and the support structure. This reduces the risk for injury to personnel and damage to equipment.

There may, from the sub-frame project upwards cover plates encircling at least a lower portion of the supporting structure. The covering of the openings between the sub-frame and the support structure may thereby be made with simple means standing up to heavy blows.

The invention more particularly concerns a load carrier device provided with a support structure and means arranged for connection to a lifting means and the support structure comprises one or more shock absorbers provided with a telescoping element which in an initial position projects downward from an underside of the support structure; wherein

- the shock absorber is arranged for damped compressive telescoping at the contact of the load carrier with a base, as the telescoping element in a fluid sealing manner is led through an end wall in a cylindrical, liquid filled shock absorber housing and is connected to a displaceable piston arranged in the shock absorber housing; and
- the shock absorber comprises means arranged for single acting damping of the telescoping element in the compressive telescoping direction, the piston or a fluid circuit connecting a piston side and a piston rod side in the shock absorber housing being provided with a flow valve arranged to choke a liquid flow from the piston side to the piston rod side, the flow in the opposite direction being approximately free.

A sub-frame arranged to abut supportingly against the basis, may be arranged vertically displaceable under the support structure being connected to the telescoping element of the shock absorbers.

The telescoping element of the shock absorbers may be arranged to be able to be displaced to an outwards projecting initial position by means of its own weight or that of its attached elements, an actuator or a combination of these.

A piston's and the telescoping element's guidance in the shock absorber housing and the end wall may provide sideways stabilization of the shock absorber.

The shock absorbers may be connected to a sub-frame by means of shock absorbing anchors providing sideways stabilization of the shock absorber.

Side guides may be connected to the sub-frame and the support structure, the side guides being arranged to prevent a horizontal displacement of the sub-frame relative to the support structure when a sideways load is applied to the load carrier.

The sub-frame may be provided with one or more side guiding elements in slidable engagement with corresponding side guiding guides in the support structure.

The shock absorbers may be integrated in a vertical framework bounding the load carrier and forming a connection between the support structure and hoisting attachments arranged in an upper portion of the load carrier.

The sub-frame may be provided with means arranged to cover the openings between the sub-frame and the support structure.

From the sub-frame there may project upwards cover plates encircling at least a lower portion of the support structure.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
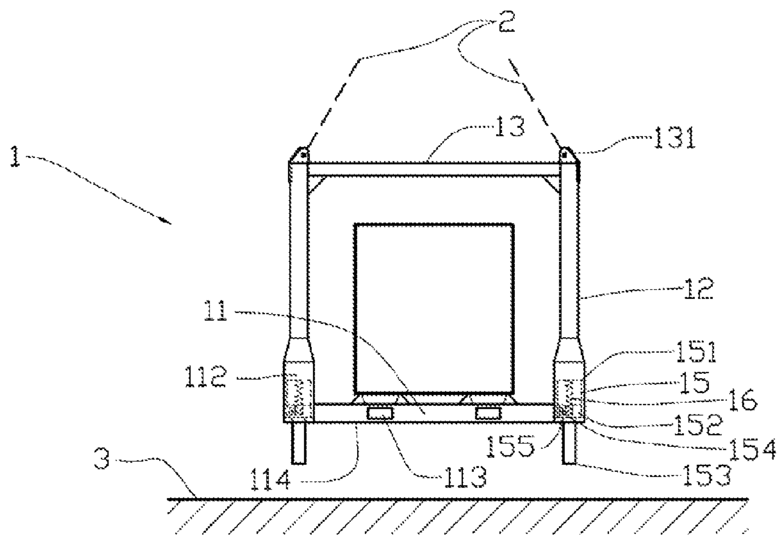
FIG. 1 shows a side view of a load carrier hanging above a deck with telescopic shock absorber elements pushed out from the underside of a support structure.

In the figures the reference numeral 1 indicates a load carrier. In the FIGS. 1, 2 and 3 it is shown as an open cargo frame, and in FIG. 4 it is schematically shown as an enclosed container. The load carrier 1 is displaced with a lifting means 2, such as a lifting crane, connected to hoisting attachments 131 arranged in a top frame 13. The load carrier 1 is expediently also configured with fork pockets 113 in a support structure 11 for placing of loading forks on a fork truck (not shown).

The load carrier 1 is arranged to rest on a supporting basis 3, such as a deck on a vessel (not shown) or a floor. The reference numeral 4 indicates schematically a load arranged on the load carrier 1.

The support structure 11 forms a basis for the load 4, possibly shaped as a floor. In the corner portions of the support structure 11 are arranged shock absorber attachments 112, shown here as an integrated part of upward projecting side frames 12.

The side frames 12 are in their upper portions joined to a top frame 13 provided with multiple hoisting attachments 131.

To each of the shock absorber attachments 112 is fastened a telescopic shock absorber 15 comprising a cylindrical, liquid filled shock absorber housing 151 containing a displaceable piston 152 provided with a telescoping element in the form of a shock absorber stay 153, which in a fluid sealing way is led through a lower end wall 155. The piston 152 is provided with a flow valve 154 arranged to choke a liquid flow through the piston 152 in a direction from the over- to the underside, while the flow in the opposite direction is approximately free.

In a first embodiment example according to FIG. 1 the shock absorber stay 153 projects in an initial position out from the end wall 155 lying in essentially the same plane as the underside 114 of the support structure 11. To ensure that the shock absorber stay 153 is displaced to its outward projecting initial position when the load carrier is lifted clear of the base 3, there is to the piston 152 connected an actuator 16, shown schematically here as a spring arranged to apply a pushing force to the piston 152 sufficient to displace it to its initial position abutting the end wall functioning as an end stop. During this displacement the fluid contained in the shock absorber housing 151 flows approximately freely through the flow valve 154 from the underside of the piston 152 to its overside. The shock absorber stay 153 is stable sideways, i.e. it resists sideways movement when sideways forces are applied. This is provided by the shock absorber 15 being rigidly attached to the load carrier 1, and the piston 152 and the shock absorber stay 153 being guided by the shock absorber housing 151 and the end wall 155 respectively.

Figure 2:
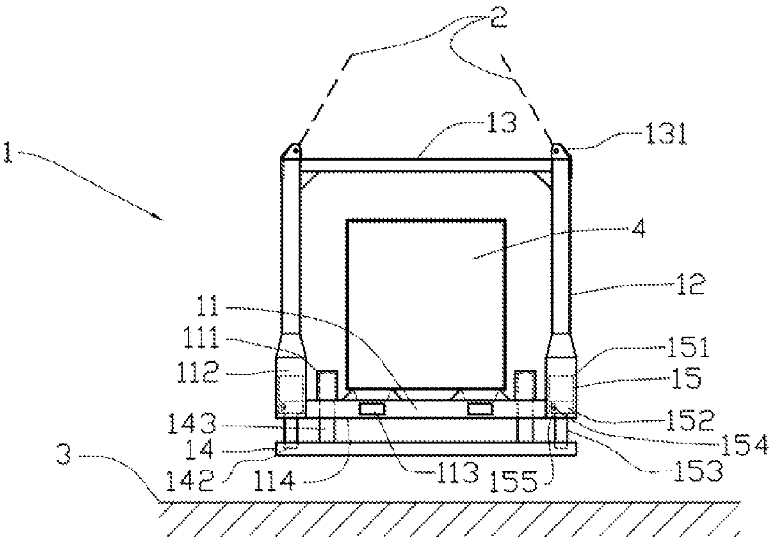
FIG. 2 shows a side view of a load carrier hanging above a deck with sub-frame connected to shock absorbers and displaced away from the main frame of the support structure.
Figure 3:
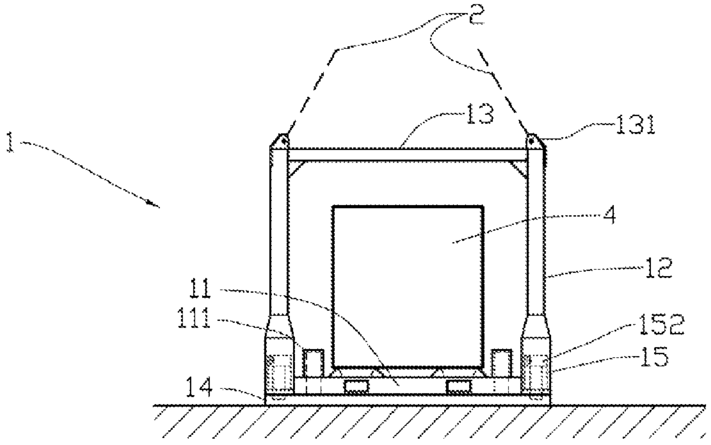
FIG. 3 shows the load carrier resting on the deck, as the sub-frame is led to abutment against the main frame.

In a second embodiment example, see particularly FIGS. 2 and 3, there is arranged a sub-frame 14 under the support structure 11. The sub-frame 14 has a horizontal extension essentially identical to the support structure 11. The shock absorber stay 153 is attached to the sub-frame 14 in shock absorber anchors 142. Sideways guiding elements 143 projecting upward extend into side guides 111 in the support structure 11 shaped like corresponding recesses that are closed towards the overside of the support structure 11.

In this embodiment example the sub-frame 14 apply a sufficient load on the shock absorber stays 153 for them to be displaced to their outward projecting initial position when the load carrier 1 is lifted clear of the base 3. In this embodiment the shock absorbers 15 may be pivotably attached to the support structure 11 and the sub-frame 14, as the sideways guiding is taken care of by the sideways guiding elements 143 and the corresponding side guides 111.

Figure 4:
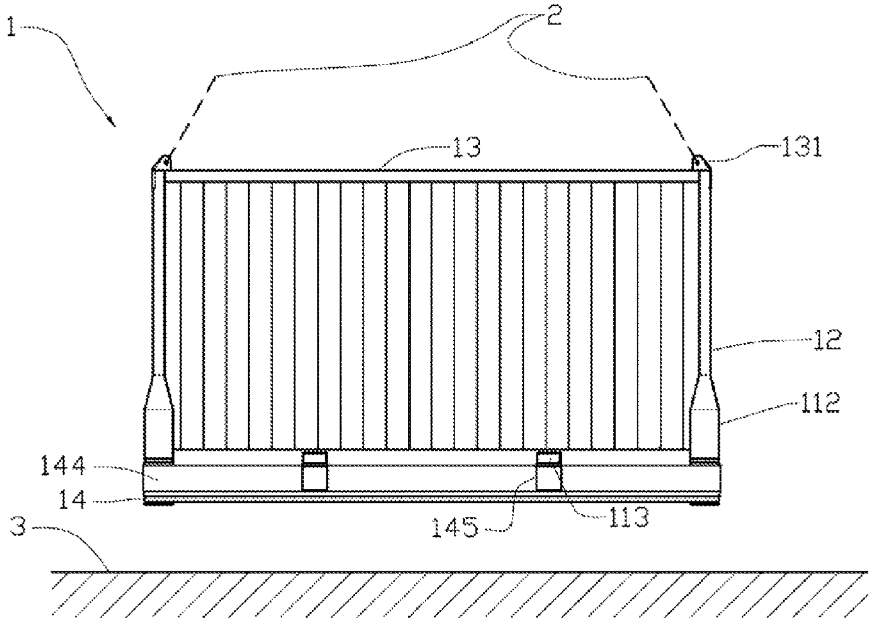
FIG. 4 shows in a side view a hanging, enclosed load carrier with the sub-frame displaced away from the main frame, and the main frame provided with cover plates arranged to prevent foreign objects being crushed between the main frame and the sub-frame.
Figure 5:
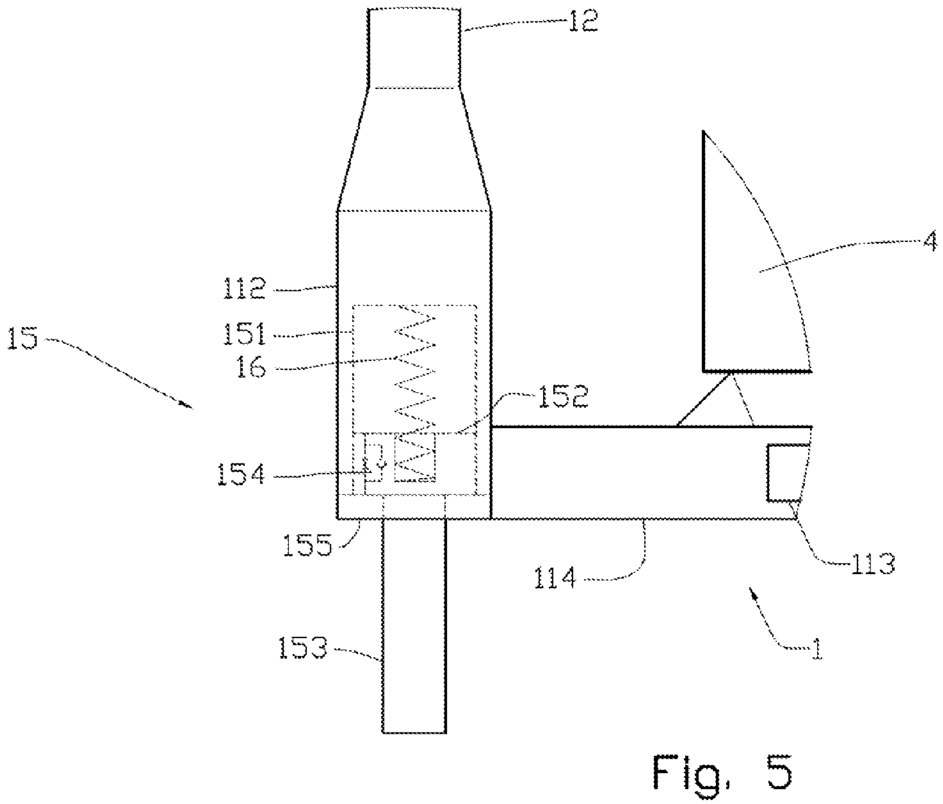
FIG. 5 shows certain telescopic shock absorber elements depicted in FIG. 1 in larger scale.

In FIG. 4 is shown an embodiment example where the sub-frame 14 is provided with cover plates 144 projecting upward and encircling the support structure 11 excepting recesses 145 arranged at the fork pockets 113.

When the load carrier 1 is lifted clear of a base 3, the shock absorbers 15 are displaced to their extended initial positions. In the embodiment examples with a sub-frame 14 it is displaced away from the support structure 11. As the load carrier 1 is lowered again toward a base 3, the first touch will be between one or more shock absorber stays 153, possibly a portion of the sub-frame 14, and any shocks are dampened by the shock absorbers 15, which, during the continued lowering of the load carrier 1 toward the base 3, are telescopically shortened with resistance caused by the flow resistance in the choking of the flow valve 154.

In the embodiment example shown in FIG. 4 the cover plates 144 provides for foreign bodies not being able to come inside and be crushed between the support structure 11 and the sub-frame 14.

The invention claimed is:

1. A load carrier for supporting a load with respect to a supporting basis, the load carrier comprising:

a plurality of vertical side frames, each side frame having upper and lower portions, the upper portions having hoisting attachments for connecting to a lifting device for lifting the load carrier off of the supporting basis;

a horizontal support structure extending between the plurality of vertical side frames;

a horizontal sub-platform below the support structure;

a plurality of liquid-filled, single-acting, independently-damping shock absorbers disposed on the lower portions of the plurality of vertical side frames and connecting the support structure and the sub-platform together; each shock absorber having a piston and stay that together move in a closed chamber between a retracted position when the load carrier is on the basis and supporting the load and an extended position when the load carrier is lifted off of the basis by the lifting device; and a stability rod disposed on the sub-platform, the stability rod arranged to telescopically move into a channel in the support structure when the load carrier is placed on the basis and the piston retracts into the retracted position, the stability rod and channel together rigidly resisting sideways movement of the load carrier and providing horizontal stability against sideways forces acting upon the load carrier when the load carrier is on the basis and supporting the load;

wherein when the piston and stay are in the retracted position, the sub-platform abuts against the horizontal support structure, and wherein when the piston and stay are in the extended position, the sub-platform is spaced apart from the horizontal support structure.

2. The load carrier according to claim 1, wherein the piston and stay of each shock absorber move under force of gravity towards the extended position when the load carrier is not on the basis.

3. The load carrier according, to claim 1, comprising a flow valve that automatically chokes flow of liquid in the closed chamber from a first side of the piston to a second side of the piston and that freely allows flow of liquid in the closed chamber from the second side of the piston to the first side of the piston; wherein when the load carrier is placed on the basis the flow valve chokes the flow of liquid from the first side of the piston to the second side of the piston rod as the piston retracts into the retracted position; and wherein when the load carrier is lifted off the basis by the lifting device the flow valve freely allows flow of liquid from the second side of the piston to the first side of the piston as the shock absorber extends under force of gravity into the extended position.

4. The load carrier according to claim 1, further comprising shock absorber anchors that anchor the stays to the sub-platform.

5. The load carrier according to claim 1, wherein the stability rod projects vertically upwardly from the sub-platform into the channel in the support structure.

6. A load carrier for supporting a load with respect to a supporting basis, the load carrier comprising:

a plurality of vertical side frames, each side frame having upper and lower portions, the upper portions having hoisting attachments for connecting to a lifting device for lifting the load carrier off of the supporting basis;

a horizontal support structure extending between the plurality of vertical side frames;

a horizontal sub-platform below the support structure;

a plurality of liquid-filled, single-acting, independently-damping shock absorbers disposed on the lower portions of the plurality of vertical side frames and connecting the support structure and the sub-platform together; each shock absorber having a piston and stay that together move in a closed chamber between a retracted position when the load carrier is on the basis and supporting the load and an extended position when the load carrier is lifted off of the basis by the lifting device; and a stability rod disposed on the sub-platform, the stability rod arranged to telescopically move into a channel in the support structure when the load carrier is placed on the basis and the piston retracts into the retracted position, the stability rod and channel together rigidly resisting sideways movement of the load carrier and providing horizontal stability against sideways forces acting upon the load carrier when the load carrier is on the basis and supporting the load, wherein when the piston and stay are in the retracted position, the sub-platform abuts against the horizontal support structure such that said shock absorbers do not attenuate shock forces after the load carrier is placed on the basis and the piston retracts into the retracted position, and wherein when the piston and stay are in the extended position, the sub-platform is spaced apart from the horizontal support structure.

7. The load carrier according to claim 6, wherein the piston and stay of each shock absorber move under force of gravity towards the extended position when the load carrier is not on the basis.

8. The load carrier according to claim 6, comprising a flow valve that automatically chokes flow of liquid in the closed chamber from a first side of the piston to a second side of the piston and that freely allows flow of liquid in the closed chamber from the second side of the piston to the first side of the piston; wherein when the load carrier is placed on the basis the flow valve chokes the flow of liquid from the first side of the piston to the second side of the piston rod as the piston retracts into the retracted position; and wherein when the load carrier is lifted off the basis by the lifting device the flow valve freely allows flow of liquid from the second side of the piston to the first side of the piston as the shock absorber extends wider force of gravity into the extended position.

9. The load carrier according to claim 6, further comprising shock absorber anchors that anchor the stays to the sub-platform.

10. The load carrier according to claim 6, wherein the stability rod projects vertically upwardly from the sub-platform into the channel in the support structure.

* * * * *